(12) United States Patent
Palushaj et al.

(10) Patent No.: US 8,580,894 B2
(45) Date of Patent: Nov. 12, 2013

(54) TWO PART, LOW MOLECULAR WEIGHT SELF CURING, LOW VISCOSITY ACRYLIC PENETRANT, SEALANT AND COATING COMPOSITION, AND METHODS FOR USING THE SAME

(75) Inventors: Simon Palushaj, Washington, MI (US); Ronald J. Lewarchik, Brighton, MI (US)

(73) Assignees: InCoat LLC, Madison Heights, MI (US); Eastern Michigan University, Ypsilanti, MI (US)

( * ) Notice: Subject to any disclaimer, the term of this patent is extended or adjusted under 35 U.S.C. 154(b) by 1162 days.

(21) Appl. No.: 12/249,406

(22) Filed: Oct. 10, 2008

(65) Prior Publication Data

US 2010/0092664 A1    Apr. 15, 2010

(51) Int. Cl.
*C08F 291/08* (2006.01)
*C08F 8/00* (2006.01)

(52) U.S. Cl.
USPC ........... 525/195; 525/191; 525/192; 525/193; 525/194; 525/330.3; 524/502; 524/853

(58) Field of Classification Search
USPC .................. 523/330.3, 502; 524/853, 502; 525/191–195, 330.3
See application file for complete search history.

(56) References Cited

U.S. PATENT DOCUMENTS

| | | |
|---|---|---|
| 2,240,778 A | 5/1941 | Hunt |
| 3,012,486 A | 12/1961 | Newey |
| 3,180,747 A | 4/1965 | Patton |
| 3,284,222 A | 11/1966 | Brotz |
| 3,419,515 A | 12/1968 | Schmidle |
| 3,786,012 A | 1/1974 | Marion |
| 3,929,692 A | 12/1975 | Offerman |
| 4,011,195 A | 3/1977 | Self |
| 4,240,936 A | 12/1980 | Henning |
| 4,265,957 A | 5/1981 | Severance et al. |
| 4,268,317 A | 5/1981 | Rayl |
| 4,299,761 A * | 11/1981 | Emmons et al. .............. 524/853 |
| 4,430,463 A | 2/1984 | Mullenax |
| 4,443,496 A | 4/1984 | Obitsu et al. |
| 4,521,249 A | 6/1985 | Obitsu et al. |
| 4,540,438 A | 9/1985 | Gutmann et al. |
| 4,687,517 A | 8/1987 | Sawaide et al. |
| 4,826,923 A | 5/1989 | Hardiman |
| 4,894,356 A | 1/1990 | Hardiman |
| 4,931,314 A | 6/1990 | Takakura et al. |
| 4,931,490 A * | 6/1990 | Armeniades ................ 523/218 |
| 4,961,960 A | 10/1990 | Iimure |
| 5,043,019 A | 8/1991 | Chervenak et al. |
| 5,072,013 A | 12/1991 | Ching et al. |
| 5,162,060 A | 11/1992 | Bredow et al. |
| 5,232,983 A * | 8/1993 | Frost ............................ 524/763 |
| 5,721,326 A | 2/1998 | Frost |
| 5,750,276 A | 5/1998 | Page et al. |
| 5,782,970 A | 7/1998 | Zawada |
| 5,843,554 A | 12/1998 | Katz |
| 6,165,386 A | 12/2000 | Endo et al. |
| 6,331,585 B1 | 12/2001 | Merkel et al. |
| 6,454,632 B1 | 9/2002 | Jones et al. |
| 6,559,260 B1 | 5/2003 | Fan et al. |
| 6,583,195 B2 | 6/2003 | Sokol |
| 6,852,800 B2 | 2/2005 | Cruz et al. |
| 6,860,794 B1 | 3/2005 | Palushi et al. |
| 6,867,275 B2 | 3/2005 | Alexander, IV et al. |
| 6,939,922 B2 | 9/2005 | Beckley et al. |
| 6,989,424 B2 * | 1/2006 | Hettich et al. ................ 525/387 |
| 7,244,775 B2 | 7/2007 | Ilenda et al. |
| 2004/0013796 A1 | 1/2004 | Metzger |
| 2007/0249779 A1 | 10/2007 | Dellandrea et al. |

FOREIGN PATENT DOCUMENTS

| | | |
|---|---|---|
| EP | 1 338 577 | 8/2003 |
| JP | 60-108430 | 6/1985 |
| JP | 06-116512 | 4/1994 |
| JP | 08-012467 | 1/1996 |
| JP | 10-110538 | 10/1996 |
| JP | 2004-122062 | 4/2004 |
| JP | 2004-218301 | 8/2004 |
| JP | 2005-015517 | 1/2005 |
| JP | 2005-023277 | 1/2005 |
| JP | 2006-088106 | 4/2006 |

OTHER PUBLICATIONS

Esacure by Lamberti—UV Photoinitiators.
Sartomer Application Bulletin—Performance Properties of Ethoxylated Bisphenol A Diacrylates.
Sartomer Company Material Safety Data Sheet—Feb. 2, 2006.
Novelty Search Report, Sep. 3, 2008.
National Renewable Energy Laboratory, "Enhanced Adhesion of EVA Laminates to Primed Glass Substrates Subjected to Damp Heat Exposure" by F.J. Pern and G.J. Jorgensen, Feb. 2005.
Bomar Specialties Co., "Polyallyl Glycidyl Ether", Oct. 7, 2005.
Cabot Corporation, "Cab-O-Sil® M-5".
Evonik INdustries, "Mhoromer® MFM 423".
OMG Americas, Inc., Material Safety Data Sheet for "6% Zirconium Hex-Cem".
OMG Americas, Inc., Material Safety Data Sheet for "6% Cobalt Hex-Cem".
Dow Corning® "Z-6030 Silane".
Sartomer Company, Inc., Product Bulletin for "Ethoxylated (3) Bisphenol A Diacrylate" Mar. 12, 2007.

(Continued)

*Primary Examiner* — Mark Kopec
*Assistant Examiner* — Haidung Nguyen
(74) *Attorney, Agent, or Firm* — Bejin, VanOphem & Bieneman PLC

(57) ABSTRACT

A self curing, two component penetrating densifying sealant and coating composition that imparts protection and reinforcement to porous substrates, such as wood and concrete, as well as non porous substrates, such a metal surfaces, whether or not corroded, and concrete surfaces.

16 Claims, 9 Drawing Sheets

(56) References Cited

OTHER PUBLICATIONS

Akrochem Corporation, "Bisomer® TMPTA".
Trimethylolpropane Triacrylate.
DeGussa, "Trimethylolpropane Trimethacrylate" Data Sheet VM 010.
Sartomer Application Bulletin, "Proposylated TMPTA Monomers: Properties and Performance".
Sartomer Company, Inc. Product Bulletin, "Trimethylolpropane Triacrylate".
ChemiK, "Trimethylolpropane Triacrylate".
NationMaster.com, "Trimethylolpropane Triacrylate", Aug. 21, 2008.
ChemBlink, "Trimethylolpropane Trimethacrylate".
OMG Americas, Inc., "SKINO #2".
Organic Chemistry Portal, "Cumene Hydroperoxide".
Syrgis Performance Initiators, Norox® 410-50P, Oct. 2007.

* cited by examiner

TWO PART, LOW MOLECULAR WEIGHT SELF CURING, LOW VISCOSITY ACRYLIC PENETRANT, SEALANT AND COATING COMPOSITION, AND METHODS FOR USING THE SAME

TECHNICAL FIELD

The instant application is related to a self curing, two component penetrating sealant densifier and coating composition that imparts protection and reinforcement to porous substrates, such as wood and other fibrous products, non-porous substrates, such as metal surfaces, whether corroded or not, cementitious and concrete surfaces. Curing may be accomplished by chemical cross linking or use of a photo initiator, whereby exposure to ultra violet radiation initiates or accelerates curing.

BACKGROUND

Generally, porous substrates, such as wood, have been painted or stained or otherwise coated to provide the substrate with a water resistant coating. As the coating wears from the surface of the substrate, it is necessary from time to time to reapply the surface coating. In addition, with respect to wood, it necessarily deteriorates with age and may become dry rotted. In the past, it was necessary to replace such wood which may be expensive and time consuming.

Non-porous substrates, such as metal surfaces, have been prone to rust, corrosion and deterioration. Current methods of dealing with rust, corrosion and deterioration involve either surface coatings which do not arrest the underlying rusted condition, costly cleaning and corrosion removal, or even more costly replacement of the metal surface.

Concrete surfaces have been prone to deterioration, which results in increased porosity, disintegration, cracking, fracturing, effloresce, dusting, staining, contamination, and makes the surface more difficult to clean or polish. Current methods of dealing with concrete deterioration involve top-coating the surface, which does not address underlying instability of the substrate and may require frequent re-application to maintain surface finish.

A need has arisen for a composition including low molecular weight, low viscosity cross linkable acrylic monomers, or polymers to provide a protective coating to metal, porous substrates and concrete surfaces and penetrate into the surface of the concrete to densify and bind the substrate together.

SUMMARY

A two-part, self-curing, low viscosity acrylic coating composition is provided. The composition includes a first component composition of (i) an effective amount of one or more low molecular weight (preferably less than about 500), low viscosity cross linkable molecules with mono, di or multi-functional acrylic, vinyl ether or methacrylic functionality; (ii) one or more hydrophobic free radical polymerizing agent; (iii) a polymerizing catalyst; (iv) a polymerization catalyst which may be a combination of one or more photoinitiators and one or more metal containing catalysts; and (vi) an adhesion coupling agent. The second component of the composition includes (i) an effective oxygenating acrylic cross linking agent; and (ii) a curing agent which contains polymerizable functional groups such as allylic, acrylic and or methacrylic.

The application of such low molecular weight, low viscosity cross linkable monomers or polymers provides a protective coating to concrete surfaces and penetrates into the surface fo the concrete to densify and bind the substrate together to present a finished surface that has a bound a bound substrate.

These and other objectives and embodiments will become apparent upon a reading of the attached specification and drawings, as well as the claims.

DETAILED DESCRIPTION

Figure 1:
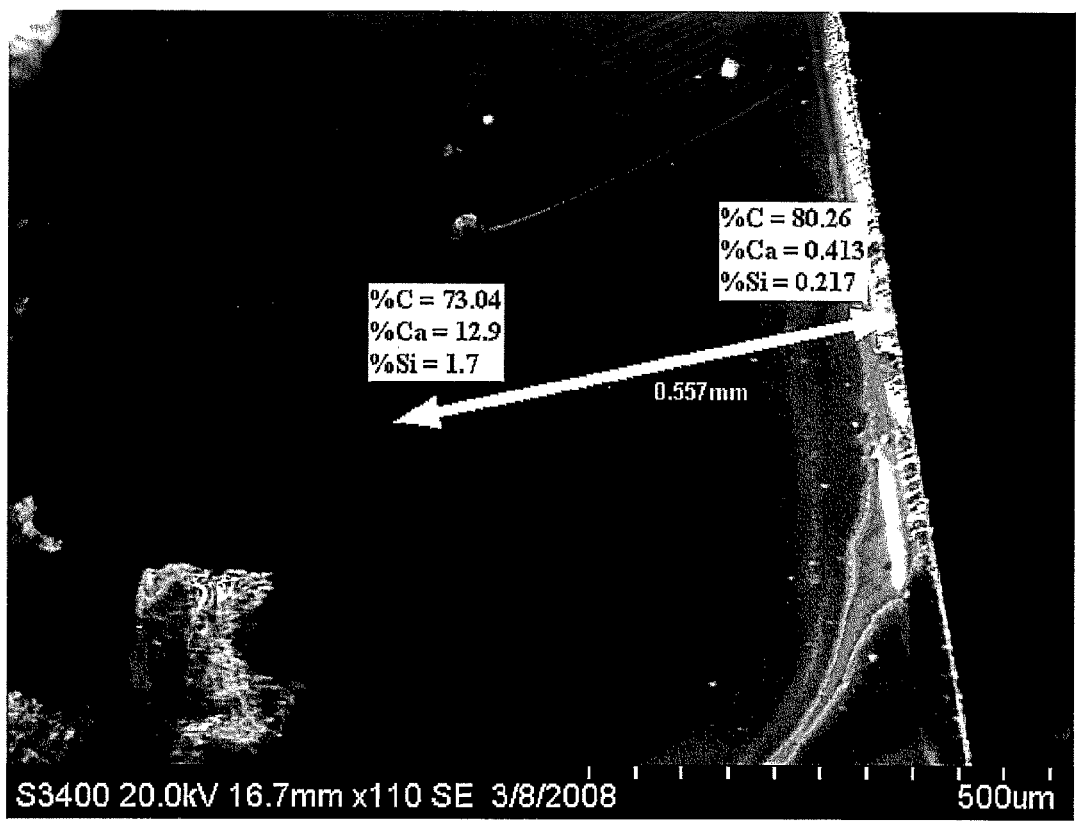
FIG. 1 is a photomicrograph of a section of polished concrete showing the top coating of the composition of one embodiment.
Figure 2:
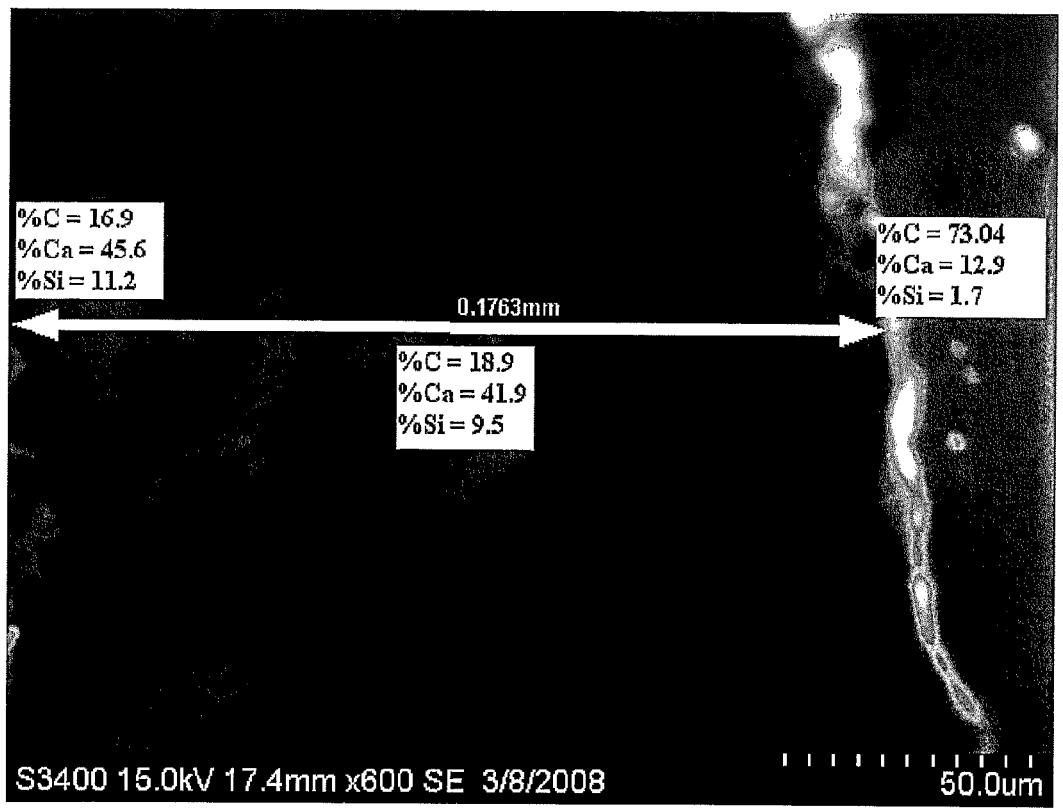
FIGS. 2 through 9 are a series of photomicrograph of a surface of a polished concrete substrate, showing the depth of penetration of the composition of one embodiment into the polished concrete of FIG. 1.
Figure 3:
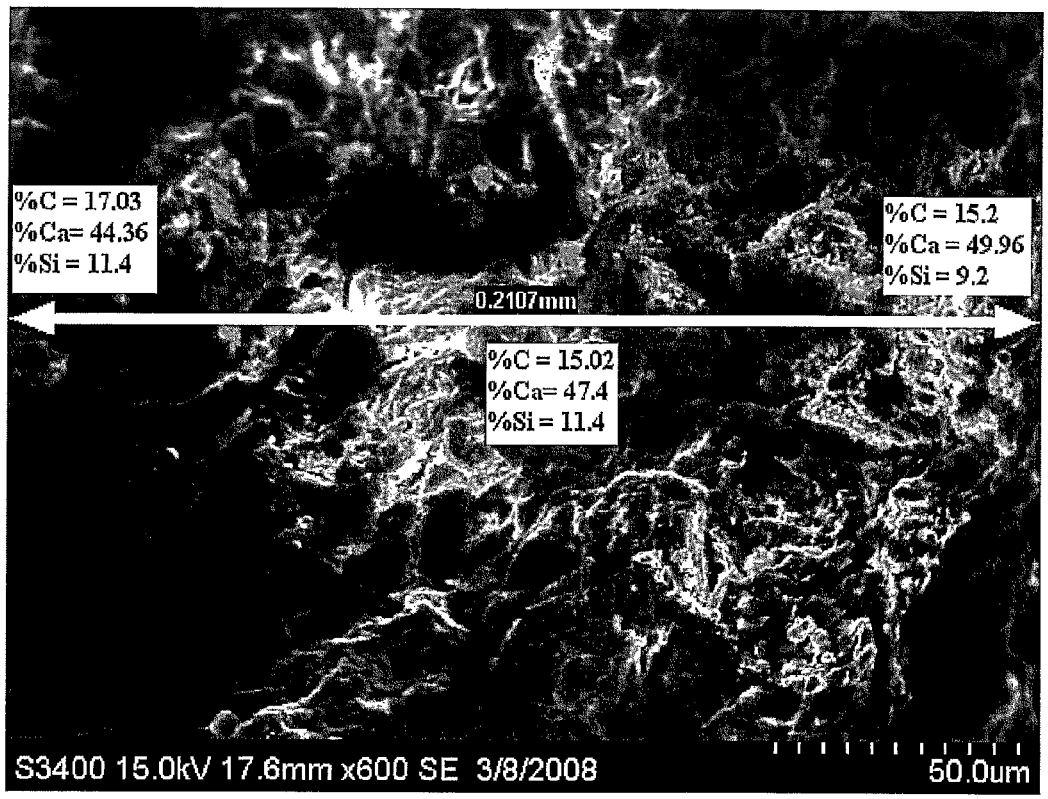
Figure 4:
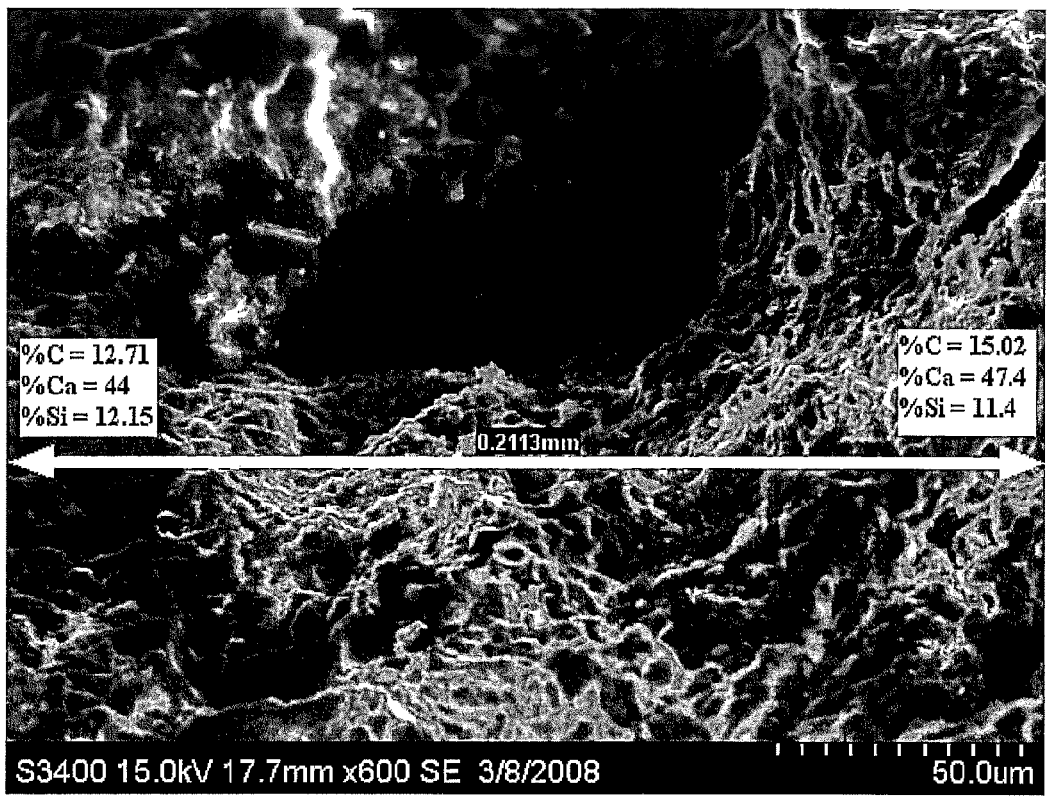
Figure 5:
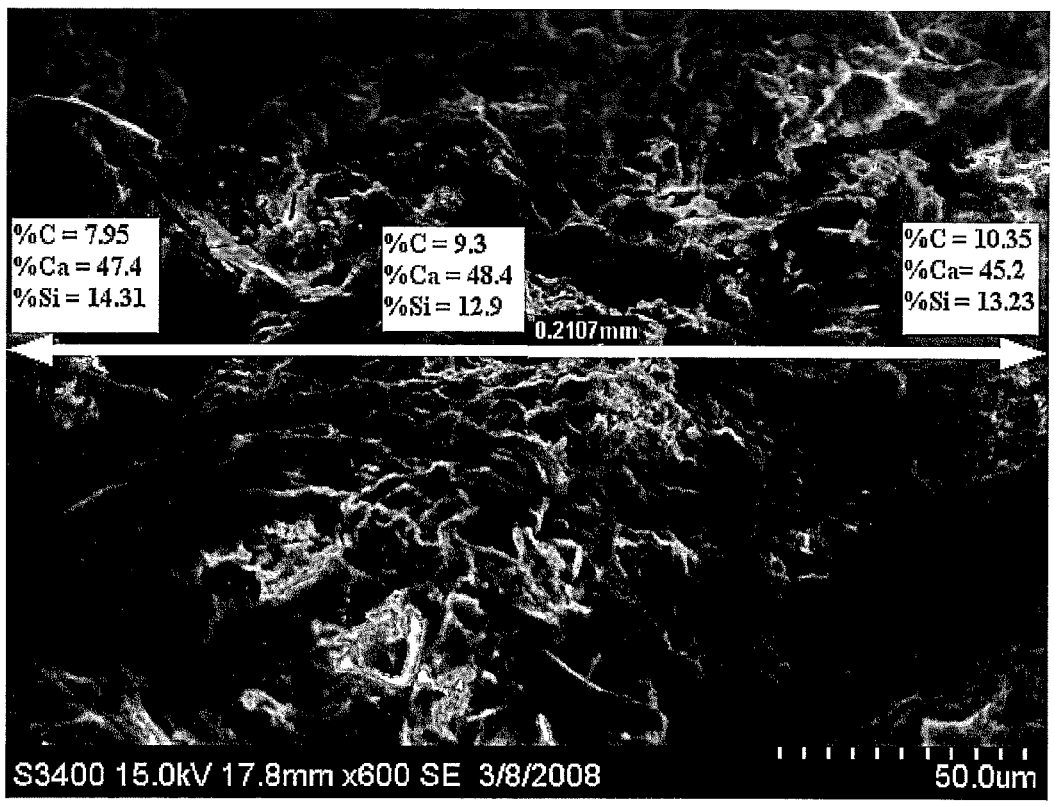
Figure 6:
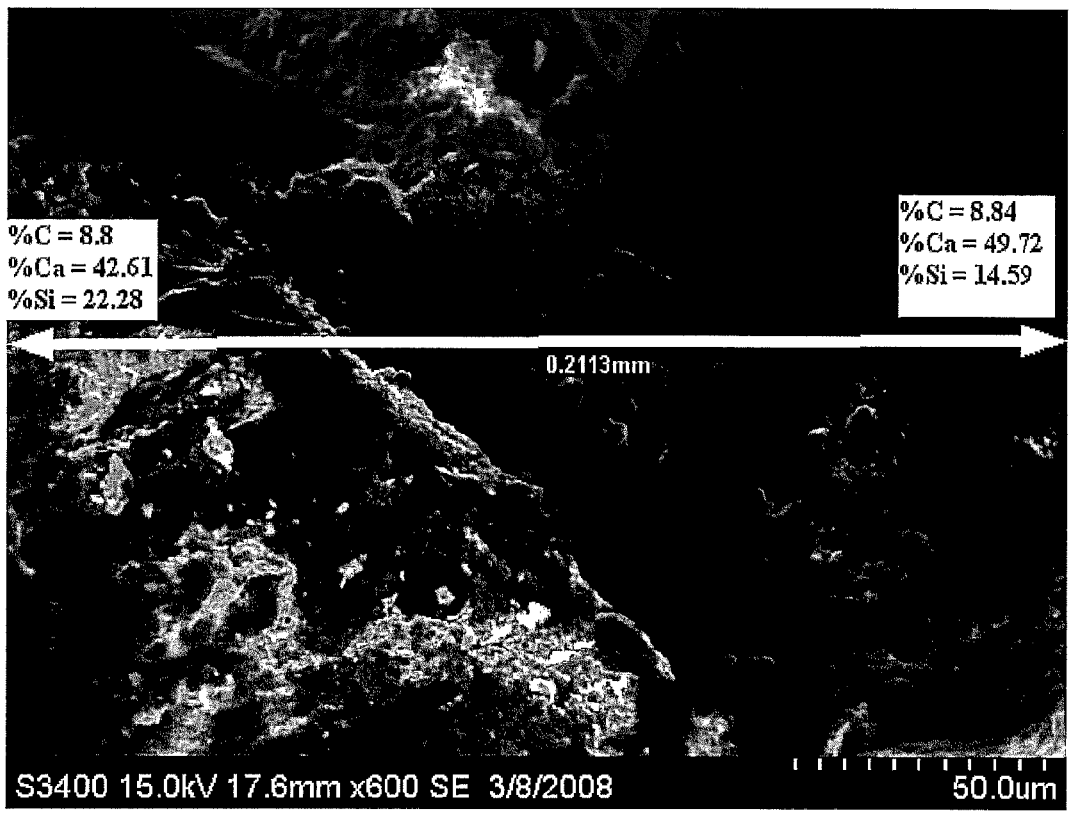
Figure 7:
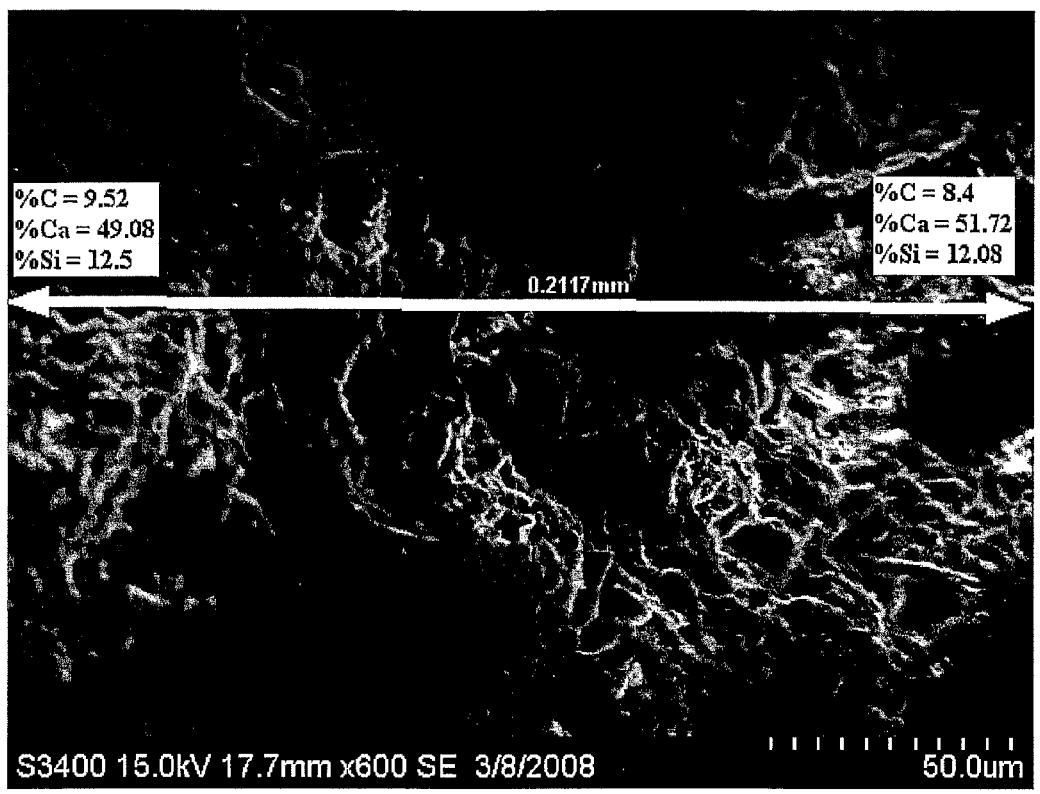
Figure 8:
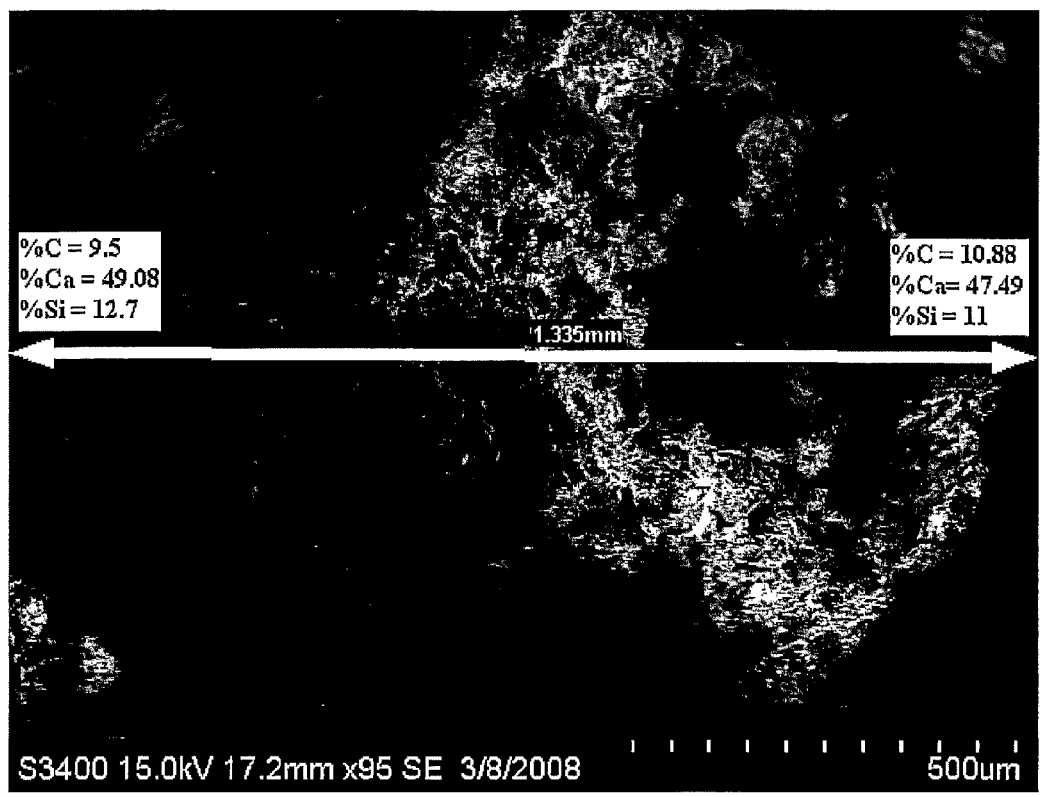
Figure 9:
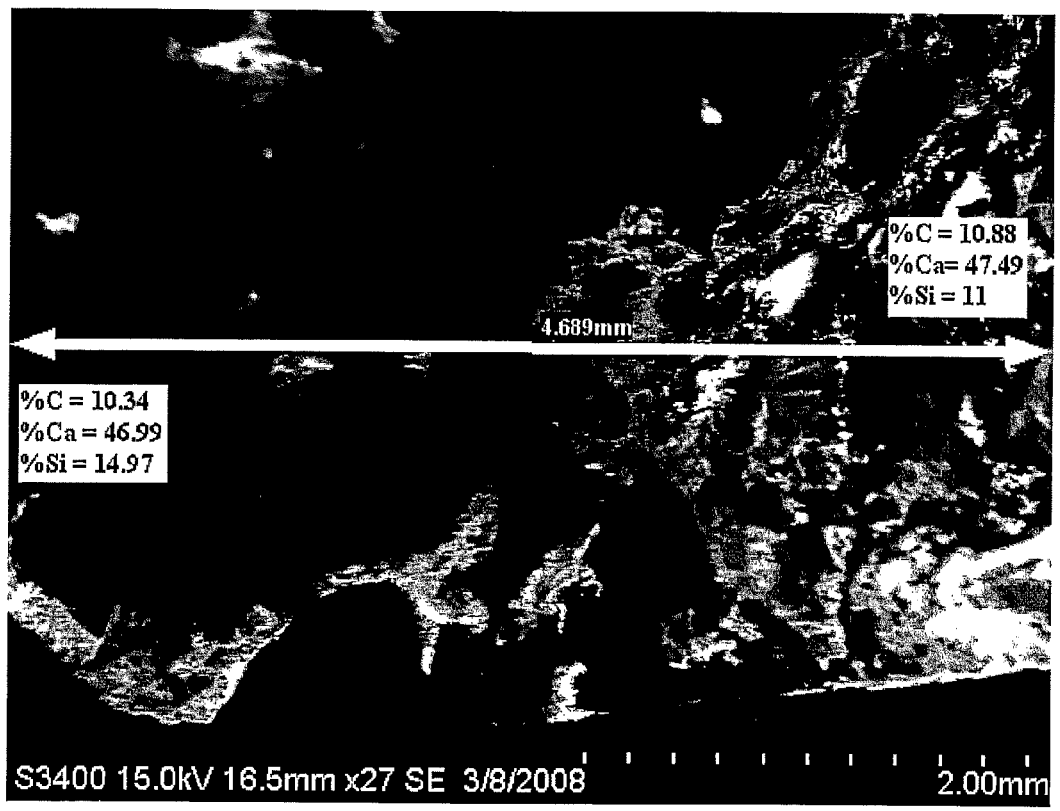

As noted hereinabove, the present application relates to a two component, self-curing, low viscosity composition for penetrating and densifying concrete on vertical, horizontal or otherwise disposed concrete surfaces. The composition may also be used to penetrate and coat metal surfaces, regardless of whether corroded or not, and seal the surface of the metal substrate and stop the corrosion process and provide for a smooth, workable surface that may be painted or otherwise treated. In addition, the composition may be used to densify and impregnate porous substrates, such as wood, to present a workable substrate that is resistant to weathering or degradation due to environmental conditions. The substrate, such as wood, so treated may be painted, stained and otherwise handled as one would ordinarily handle a wood substrate.

The composition described herein is adapted to the above uses and is adapted to prevent water or other foreign matter from entering into the surfaces or substrates so treated. One advantageous aspect of the present disclosed composition is that the cross linking reaction of the acrylate groups of the acrylate monomer may be self-curing. In the alternative, UV light may be used to initiate or accelerate the cross linking of the acrylate monomer, thereby decreasing cross linking time and greatly reducing the period of time within which the treated substrate should not be touched.

As is disclosed herein below, there is provided a composition which is adapted to densify and fill the voids in concrete, impregnate porous substrates, such as wood, or coat metal surfaces, regardless of whether corrosion is present on the surface, to present a smooth, durable, wear resistant surface that can be painted, machined, polished or otherwise used as intended.

The low viscosity sealant composition can be characterized as having two parts—a first component, which is the base, and a second component, which is the curative. Typically, the first component of the composition includes one or more polymerizable groups such as acrylic, methacrylic, and or vinyl ether manufactured by Sartomer, Cytec, or any other manufacturer of suitable materials. In accordance with a preferred aspect, in a product formulation it is possible to use difunctional acrylate monomers, trifunctional acrylate monomers, generally multifunctional acrylate monomers or various blends thereof. The first component of the composition may also include mono-functional acrylate monomers blended with multi-functional acrylates. With respect to the monomers which comprise the base of the first component, it may be preferable that low viscosity, especially low surface tension monomers be used.

For example, suitable monomers for use in the first component may include molecules containing acrylic functionality, such as, for example, trimethylolpropane triacrylate, trimethylolpropane trimethacrylate, and mixtures thereof. Other suitable acrylates include polyethylene glycol derivatives such as Methoxy Polyethylene Glycol Monoacrylate, Polyethylene Glycol (200) Diacrylate, Polyethylene Glycol (400) Diacrylate, Polyethylene Glycol (600) Diacrylate, Ethoxylated Trimethylolpropane Triacrylates with different ethoxylation levels, other examples of acrylates such as hexanedioldiacrylate, urethane acrylates, epoxy acrylates, ethoxylated bisphenol A diacrylate may also be used. The acrylates may be present in an amount sufficient to promote a suitable acrylic coating material, and more particularly, may be present in an amount of from about 25 phw to about 75 phw of the composition.

The first component of the composition may be modified by means typically used in paints and other sealants such as those used in the manufacturing industries, namely by the addition of fillers such as crosslinkers, clay, calcium carbonates, talc etc., rheology modifiers such as bentonite clays and their modifications, fumed silica, and other similar modifiers, as well as curing agents. Other modifiers may include pigments, adhesion promoters, defoamers and other similar liquid property modifiers.

A crosslinker suitable for application in the present disclosure may be a hydrophobic crosslinker, such as, for example, ethoxylated (3) bisphenol A diacrylate or dimethacrylate, 1,6-hexanediol dimethacrylate, 1,6-hexane diacrylate or isobornylmethacrylate, isobornyl acrylate. The hydrophobic cross-linker may be present in an amount sufficient to promote cross linking of the acrylate monomer, and more particularly, are present in an amount of from about 16 phw to about 34 phw of the composition.

Metal carboxylates may be used as condensation catalysts, and may include, for example, zirconium 2-ethylhexanoate, and cobalt 2-ethylhexanoate, other metal salt catalysts may use carboxylic acid salts of manganese, iron, lead, calcium, cerium and zinc and mixtures thereof. Other suitable catalysts include Both are available from OM Group, Americas, Inc, as 6 phw solutions of either zinc 2 ehtylhexanoate, or 6 phw solution of cobalt ethylhexanoate. These metal carboxylates may be used individually in an amount of about 1 phw, or as mixtures thereof. Preferably, the mixture is a 50/50 mixture of 6 phw solution of cobalt and zinc ethylhexanoate, present in an amount of about 1 phw of the composition.

A rheology modifier may also be employed to adjust viscosity of the composition. Suitable rheology modifiers may be fumed silica, which is an amorphous colloidal silicon dioxide, such as CAB-O-SIL, available from Cabot Corporation. Other suitable rheology modifiers include cellulose acetate butyrate from Eastman Chemical and microgel. Other rheology control agents which are familiar to those skilled in the art may be used.

A suitable adhesion promoter may be functional silanes. Suitable silanes are bi-functional silanes containing a methacrylate reactive organic group and a trimethoxysilyl inorganic group. One such suitable silane is γ-methacryloxypropyltrimethoxysilane, available as Z-6030 from Dow Corning. Other examples of silanes from Dow Corning which may be used include Z-6040 (epoxy functional), Z-6094 (amino functional) and Z-6910 (mercapto functional). These silanes may be present in an amount sufficient to promote adhesion, and more particularly, are present in an amount of from about 1 phw of the composition.

A suitable anti-skinning agent may include methylethylketoxime available from OMG Americas, Inc., under the product name SKIN #2. The material may also generically be known as MEKO. The additive may be present in an amount suitable to control skinning at the surface which may be detrimental to cure throughout the composition. MEKO is used in sufficient amount to control skinning as well as to promote through-cure in the presence of a cobalt drier. More particularly, MEKO is used in an amount of from about 0.1 phw to about 2.0 of the composition. In addition, it has been determined that a ratio of 50/50 of 1 phw of methylethylketoxime with 1 phw of an amorphous colloidal silicon dioxide, such as CAB-O-SIL M-5, available from Cabot Corporation is particularly effective for controlling skinning and viscosity. In another embodiment, the anti-skinning agent is a mixture of about 1 phw of methylethylketoxime and 2 phw of in an amount of an amorphous colloidal silicon dioxide, such as CAB-O-SIL M-5, available from Cabot Corporation.

The second component of the composition includes a curative, typically derived from the reaction of a suitable reactant (such as acrylic acid or methacrylic acid) with an epoxy group to produce an acrylic or methacrylic functional molecule. The ethylenically unsaturated crosslinking agent generally has a plurality of these functional groups which crosslink the ethylene polymer component of a second molecule by reaction between the unsaturated groups or allylic hydrogens of other coreactants. Aliphatic type unsaturated cross linking agents include acrylic functional crosslinkers derived from the reaction between an alcohol group and an acid group to produce an acrylic or methacrylic functional crosslinker. Accordingly, building blocks used to create acrylic or methacrylic functional molecules may include the glycidyl ethers of polyhydroxy, polythio and polycarboxy aliphatic compounds, particularly polyglycidyl ethers of polyalcohols, such as, for example, diglycidyl ethers of a, w-diols, including butanediol diglycidyl ether, hexanediol diglycidyl ether, paracyclohexyldimethanol diglycidyl ether, neopentyl glycol diglycidyl ether, triglycidyl ethers of triols, including trimethylolpropane triglycidyl ether and glycerol triglycidyl ether, and tetraglycidyl ethers of tetrols including pentaerythritol tetraglycidyl ether and the like. There may also be mentioned here suitable acrylic or methacrylic crosslinkers derived from epoxidized olefin compounds such as, for example, epoxidized soybean oil, epoxidized linseed oil, epoxidized cycloolefins and cyclic dienes, cycloaliphatic epoxides such as vinyl cyclohexene dioxide and bis(3,4-epoxy-6-methylcyclohexyl methyl)adipate, and the like. Other suitable reactive crosslinkers may be derived from the reaction of an isocyanate group with that of an alcohol functional acrylic or methacrylic monomer to produce a molecule with one or more urethane linkages and one or more acrylic or methacrylic functional groups. Molecules derived from this reaction are classified as urethane acrylates or urethane methacrylates. Examples of such molecules include the reaction of isophorone diisocyanate, toluenediisocyanate and hexamethylene diisocyanate or isocyanate functional reactants derived from these isocyanates with stoichiometric amounts of alcohol functional acrylic or methacrylic reactants. Suitable aliphatic or aromatic urethane acrylates are available from Sartomer. Examples may include CN9001, CN9002, CN959, CN 964, CN975, CN972.

As the preferred acrylic or methacrylic functional aromatic type cross-linking agents, may be derived from glycidyl ethers, thioethers, and esters of aromatic compounds having an average of from about 2 to about 4 hydroxy, thio, carboxy, or mixture of such groups per molecule such as, for example, diglycidyl ether of bisphenol A, diglycidyl ether of bisphenol F, diglycidyl ether of resorcin, polyglycidyl ethers of phenol novolacs, polyglycidyl ethers of cresol novolaks, diglycidyl esters of phthalic acid, and the like. Also suitable are the polyglycidyl ethers of the polyalkylene oxides of the foregoing aromatic polyglycidyl ethers and esters. Examples of such cross-linking agents may include CN 104, CN 119, CN120 and SR 531 from Sartomer.

Examples of suitable peroxide cross linkers include known compounds such as alkyl peroxides, particularly tert-butyl peroxide or di-t-butyl peroxide, 2,5-dimethyl-2,5-di-(tert-butylperoxy)hexyne-3,2,5-dimethyl-2,5-di-(tert-butylperoxy) hexane, benzoyl peroxide and other diacyl peroxides, hydroperoxides such as cumene hydroperoxide, peresters such as t-butylperoxybenzoate; ketone hydroperoxides such as methyl ethyl ketone hydroperoxide. Commercially available organoperoxides which are suitable are available from Elf Atochem N.V. under the LUPERSOL® mark, for example LUPERSOL 130, believed to contain a mixture of 2,5-dimethyl-2,5-di(tert-butylperoxy)hexyne-3 and di-t-butyl peroxide, and LUPERSOL 101, containing 2,5-dimethyl-2,5-di (tert-butylperoxy)hexane and di-tert-butyl peroxide. Most preferably, cumene hydroperoxide, peroxy esters such as Norox 411, LUPERSOL P and poly dimethylperoxides such as LUPEROX 224 may be used. Depending upon the efficacy of the peroxide cross linker, it may be present in an amount of up to about 6 phw of the second component. Other suitable initiators may include ketone peroxides, such as Trigonox 44B, diacyl peroxides, perseter peroxides, perketals, dialkyl peroxides, peroxydicarbonates and hydroperoxides. These materials are available from suppliers such as Akzo-Nobel, Sartomer, and Sigma-Aldrich.

The second component of the composition may further include a low viscosity additive oligomer, such as polyallyl glycidyl ethers known as BXI-100 available from Bomar Specialties Company for obtaining the benefit of free radical curing in dark sections or areas without line of sight to a Ultra-Violet source, such as a masked or shadowed area. Generally, the preferred polyallyl glycidyl ether has a Brookfield Viscosity @ 25° C. of about 200 cP, and a density @25° C. of about 1.05 g/cm3. The polyallyl glycidyl ether enhances storage stability and formulation working pot lifetime of the composition.

Optionally, the second component of the composition may further include methylethylketoxime in an amount sufficient to act as a curing agent, and most preferably, in an amount of up to about 2 phw of the second component.

In certain formulations, it may be desirable to include photoinitiators to assist in curing. Photoinitiators which are suitable for use in the practice of the present invention include, carbonyl compounds include ketones, such as 1-phenyl-2-hydroxy-2-methyl-1-propanone; oligo(2-hydroxy-2-methyl-1-phenyl-propan-1-one; oligo (2-hydroxy-2-methyl-1-(4-(methylvinyl)phenyl)propanone), and 2-methyl-1-[4-(methylthio)phenyl]-2-(4-morpholinol)-1-propanone; 1-(hydroxycyclohexyl)phenyl ketone and mixtures thereof; acetophenones, such as α,α-dimethoxy-α-phenylacetophenone); benzophenones, such as 2,4,6-trimethylbenzophenone; 4-methylbenzophenone, and other such benzophenone derivatives; non-carbonyl-containing photoinitiators, include phosphine oxide and derivatives thereof such as phenyl bis[2,4,6-trimethyl benzoyl]phosphine oxide and bis(2,6 dimethoxybenzoyl)phosphine oxide; (2,4,4-trimethylpentyl) phosphine oxide as well as mixtures thereof.

The benzophenone derivatives may be aldehyde-substituted benzophenones, cycloalkyl-substituted or aryl-substituted benzophenones. Furthermore the substituted component may be further substituted with alkyl or aryl substituents. The phosphine oxide may be similarly substituted.

As noted, above, the mixture of photoinitiators may comprise from about 0.001 to about 4.0 phw of the total weight of the composition.

One photoinitiator comprises a mixture of: (a) a blend of: (1) bis(2,6-dimethoxybenzoyl)(2,4,4-trimethylpentyl)phosphine oxide; and (2) 1-hydroxycyclohexyl phenyl ketone; (b) 2-methyl-1-[4-(methylthio)phenyl]-2-[4-morpholinyl]-1-propanone, and (c) a mixture or blend of: (1) 2,4,6-trimethylbenzophenone, (2) 4-methylbenzophenone; and, (3) oligo (2-hydroxy-2-methyl-1-4-methylvinyl)phenyl)propanone. These photoinitiator blends are well known and commercially available. Photoinitiators (a) and (b) are sold under the marks Irgacure® 1800 and 907, respectively, by Ciba Specialty Chemicals. Photoinitiator (c) is sold by Sartomer under the name Esacure® KTO 46.

When a photo initiator is used, it may be desirable to use a UV light to initiate the curing of the composition. Photo initiators are included in an amount sufficient to promote curing when subjected to UV radiation, and more preferably, the photo initiator is present in an amount of up to about 6 phw of the composition.

With respect to the curing time after blending together part A and part B of the product, the chemical reaction may have to be delayed for a suitable time to allow the product to be suitably seeped into the surface to be treated, or to adhere to the surface. Or alternatively, if the composition is to be cured by UV light or heat sufficient time must be allowed to permit penetration into or on the surface. With respect to the curing time, after delivering the mixed product onto the desired surface, the curing process should be timed as to allow maximum penetration of the coating material into the substrate.

FIG. 1 is a photomicrograph of a section of polished concrete treated with 100% solids, ambient cure, acrylic system with 0% silica formulation, designated as Formula A 13 B6, as further discussed in the examples that follow. The photomicrograph delivers data relating to the amounts of carbon, calcium and silica to demonstrate when the coating layer meets the concrete. Basically, the concrete has a different component composition than the acrylic coating, and, as can be seen in FIGS. 2 through 9, the percentage of carbon, calcium and silicon decrease as the acrylate composition penetrates the concrete, until such point as only the concrete materials are measured. At that point, it will be understood that the limit of penetration of the acrylic material into the polished cement has been reached. At which point, a total depth of penetration of the acrylic can be determined.

Turning again to FIG. 1, it can be seen that the top layer coating is comprised of 80.26% C, 0.413% Ca and 0.217% Si. The depth of the layer is 0.557 mm as can be determined by the change in temperature of the material, i.e. the concrete composition changes the overall % of the composition to 73.04% C, 12.9% Ca and 1.7% Si. This change indicates that the top layer is essentially the acrylic coating, and where the composition changes, it is penetrating into the concrete matrix.

FIGS. 2 through 9 show the progression of the acrylic penetration into the concrete substrate. Examination of the FIGS. 2 through 9, it can be seen that Si content generally increases as the depth of penetration, and carbon content decreases as the depth of penetration once chemical analytics determine that only concrete is being analyzed, the total depth of penetration can be determined. In the example shown in FIGS. 1 through 9, it can be seen that the top layer is 0.557 mm, and the depth of penetration into the concrete is 7.813 mm.

The following Examples provide an illustration of the present invention. The Examples, however, should be not be construed as limiting the invention in any way.

EXAMPLES

Example 1 demonstrates results obtained from exposing the coating formed from the cured two part composition of various formulations according to the present disclosure, to household chemicals to determine the durability of the coating.

Summary:
  (1) Household chemical test as per ASTM method D1308 of coated concrete blocks A9B6, A13B6, two coat (wet/wet) A13B6/A15B6 (polished and unpolished), A16B6 (3% Esacure ONE with A9B6), Raw Concrete, Control and UV 2282.
  (2) SEM Analysis of samples—A9B6, A13B6, A13B6/A15B6 (polished side and unpolished side), A16B6, Diama Guard 1, and Diama Guard 2

(1) Household Chemical Test:
Objective:
Determine the effects of household chemicals on non-pigmented coated polished concrete blocks.
Method:
ASTM D1308-87 (Standard test method for effect of household chemicals on clear and pigmented organic finishes), 1998
Test:
Spot test open
Eighteen reagents:
  Distilled water
  Ethyl alcohol (50% in water, v/v)
  White vinegar (Meijer White Distilled Vinegar, 5% acid)
  Alkali solution (50% NaOH in water, w/v)
  Acid solution (10% $H_2SO_4$ in water, v/v)
  Soap solution (From CRI Lunch Room, Brand Unknown)
  Detergent solution (From CRI Lunch Room, Grand: Dawn, Antibacterial, Orange)
  Lighter fluid (Zippo Premium Lighter Fluid, Meijer)
  MEK (Home Depot)
  Apple (Green) [Golden Apples, Meijer) and Orange (Meijer)
  Meijer Vegetable Oil
  Mustard and Catsup (Brand: Heinz Sachet)
  Beverages (B&F Coffee connection, Classic coffee, Caffeinated and Lipton Tea (1 tea bag in ½ hot water in 8 oz. paper cup)
  Brake Fluid (Meijer Brand, Dot 3, Premium Extra heavy duty)
  Xylene/Mineral Spirit, 50/50, v/v)—Specified by Mfg.
Formulation:
A9B6=acrylate formulation with 1% silica
A13B6=acrylate formulation with no silica
A15B6=acrylate formulation with 2% silica
A16B6=acrylate formulation with 1% silica+3%
Control=Diama Guard
Sample Preparation:
  (1) Five concrete blocks were coated.
    a. For single coat system, i.e. samples A9B6, A13B6, and A16B6 were applied by pouring 10 g. of sample onto concrete block, received on 15 Feb. 2008.
       For two coat (wet/wet) system, i.e. samples A13B6/A15B6 were applied on top (polished) and bottom (unpolished) surfaces of the concrete blocks, received on 15 Feb. 2008. At first, 10 g. of A13B6 was poured onto concrete surface at ambient conditions.
       After 1 hr., 10 g. of A15B6 was poured on it at ambient conditions.
       The coated blocks were cured for at least 1 week under ambient (room temperature/humidity) conditions before testing.
  (2) The chemical reagents/solvents were applied in quantity as described in ASTM method D1308-87. Time-observation (as the method) was done for 16 hours.
Effects to be observed (as per ASTM method):
  Discoloration, changes in gloss, blistering, softening, and swelling.
  For softening, use a subjective test like touching the exposed area with a wooden tongue depressor and comparing to an adjacent unexposed area
Results & Observations:
  (1) Gel Time: For A9B6=5-10 min. A13B6=24 hours, A15B6=24 hours, and A16B6=3-4 days
  (2) Household chemical Test results:
    Test Temperature: 22.4° C.
    Test Humidity: 20%
    Time: 16 hours

| Reagents | Raw Concrete | Control | 100% solids ambient A9B6 (1% silica) | 100% solids ambient A13B6 (0% silica) | 100% solids ambient two coat A13B6 (0% silica)/A15B6 - 2% silica (polished side) | 100% solids ambient two coat A15B6 (0% silica)/A15B6 - 2% silica (unpolished side) | 100% solids ambient two coat A13B6 [=A9B6 + 3% Photo initiator Esacure One] |
|---|---|---|---|---|---|---|---|
| Distilled water | 10 | 10 | 10 | 10 | 10 | 10 | 10 |
| MEK | 10 | 10 | 10 | 10 | 10 | 10 | 10 |
| Mustard | 4 | 7 | 8 | 8 | 8 | 9 | 10 |
| Catsup | 5 | 10 | 10 | 10 | 9 | 10 | 10 |
| Coffee | 6 | 7 | 10 | 10 | 10 | 10 | 10 |
| Tea | 4 | 10 | 10 | 10 | 10 | 10 | 10 |
| Vegetable oil | 4 | 4 | 10 | 10 | 10 | 10 | 10 |
| Apple | 10 | 10 | 10 | 10 | 10 | 10 | 10 |

-continued

| Reagents | Raw Concrete | Control | 100% solids ambient A9B6 (1% silica) | 100% solids ambient A13B6 (0% silica) | 100% solids ambient two coat A13B6 (0% silica)/A15B6 - 2% silica (polished side) | 100% solids ambient two coat A15B6 (0% silica)/A15B6 - 2% silica (unpolished side) | 100% solids ambient two coat A13B6 [=A9B6 + 3% Photo initiator Esacure One] |
|---|---|---|---|---|---|---|---|
| Orange | 5 | 10 | 7 | 7 | 7 | 7 | 10 |
| Ethyl alcohol | 10 | 10 | 10 | 10 | 10 | 10 | 10 |
| 50% NaOH | 1 | 9 | 7 | 7 | 7 | 7 | 8 |
| 10% $H_2SO_4$ | 1 | 1 | 7 | 7 | 7 | 7 | 8 |
| Hand Soap | 4 | 4 | 10 | 10 | 10 | 10 | 10 |
| Natural dish washing | 4 | 5 | 10 | 10 | 10 | 10 | 10 |
| Vinegar | 6 | 2 | 10 | 9 | 9 | 10 | 10 |
| Lighter Fluid | 10 | 10 | 10 | 10 | 10 | 10 | 10 |
| Brake Fluid | 10 | 6 | 10 | 10 | 10 | 10 | 10 |
| Xylene/MS | 10 | 10 | 10 | 10 | 10 | 10 | 10 |

Reference:

| Rating | Coating appearance |
|---|---|
| 10 | no effect |
| 9 | very slight effect |
| 8 | slight effect |
| 7 | very slight stain |
| 6 | slight stain |
| 5 | moderate stain |
| 4 | severe stain |
| 3 | slight loss |
| 2 | moderate loss |
| 1 | total loss |

Example 2 is a table showing the spreading rate of coating systems, prepared in accordance with the various formulations described in Example 1.

Summary Table Showing Spreading Rate of Coating Systems

| Coating Systems | Spread Rate ($cm^2$/gm.) |
|---|---|
| 100% solids ambient cure - acrylate system with 1% silica: A9B6 | 9.4 |
| 100% solids ambient cure - acrylate system with 0% silica: A13B6 | 10 |
| 100% solids ambient cure - acrylate system with 1% silica + 3% Photoinitiator Esacure One: A16B6 | 8.6 |
| Polished Side of block: 100% solids ambient cure - acrylate system - two coat: A13B6 (0% silica) + A15B6 (2% silica) | 10 |
| Un-polished Side of block: 100% solids ambient cure - acrylate system - two coat: A13B6 (0% silica) + A15B6 (2% silica) | 10 |

Example 3 demonstrates the procedure to determine the penetration of various formulations according to the disclosure on polished concrete surfaces. The formulations are as described in Example 1 and the procedure used to determine penetration by the formulations is described below.

(2) SEM-EDX Analysis Report:

Samples:
  on polished concrete
    100% solids at ambient temperature A9B6, A13B6, A13B6/A15B6 (polished side and unpolished side), A16B6
    100% solids UV MS-I on polished concrete
    SC_I,UV waterborne UV 2282+0.5% PI 1173 on polished concrete Part of the sample to be analyzed:
  Top down view—Organic Coating
  Side view—To measure depth of penetration of coating onto concrete
  Bottom—Plaint Concrete for reference in Elemental Analysis Step-Wise Procedure:

Preparation of the sample:
  Clean aluminum table mount with acetone for substrate or specimen.
  Break 2 little samples of each concrete (one for top view and one for the side view and the third for plain concrete). The maximum height of the sample as prescribed is 55 mm. All specimens were collected by breaking the concrete blocks from edges/sides.
  A carbon conductive adhesive (Nem tape) is used to hold the sample firmly to the table mount. The placing of concrete specimen or coated specimens were carefully done to observe the depth of penetration.
  Sputter Coating with Gold: For best images gold coat the sample with a sputter coater prior to examination to make it conductive:
    sputter set point: 30
    sputter time: 45 seconds SEM:
  Open the PC-SSEM program
  Write the dimensions of the sample: the highest height (use the available white tool to measure) and diameter of the mount table
  Make sure the sample stage is at Z65 home position
  Make sure the high voltage is off
  Click on air button to let air go in
  Open the door, place the sample and close the door
  Click on EVAC button to vacuum the chamber
  Select Std SEM and current pressure: <1 Pa
  Wait until the vacuum is ready then push ON button to send electron light. Start with a low quantity (15kV)
  Turn on the IR chamber scope and remote controller
  To move closer the sample, click on stage and reduce the distance slowly. Be careful! The sample is not to touch the camera!
  Find a good image with the wanted area by using the operational panel having knobs and trackballs
    Trackball: to move the sample stages
    Magnification: to zoom
    Focus: to find the sharpest image
    Stigmatization: to find the sharpest edge
    Image shift: to move the image on the screen by moving the beam (not the sample stage). Only to be used at ultra-high magnification
    Brightness and contrast
  Whenever you make changes click on ABBC (auto contrast and brightness) and AFC (focus) to have a sharp image
  When you have a good image, turn off the IR chamber scope and remote controller and transfer in analysis by opening the program EDS 2006
  Verify than counts >1000 counts/second. If not, increase the quantity of sent electron light (>15kV)
  Click on camera to take a picture
  Choose a time to analyze: we generally took 30 seconds
  Select an area on the picture with the mouse
  Right click with the mouse:
    auto ID: gives the composition
    quantify: gives the quantity
  When it's over, turn HV off, air the chamber, take out the sample and vacuum
  Turn off the IR detector and shut down the computer if you are the last one
Summary of Results:
  (a) Top down view (SEM) of coated specimen with elemental analysis by % wt. using EDX:
Summary Table for Depth of Penetration of all coatings:

| Sample/Coating | Depth of Penetration (mm) |
| --- | --- |
| Control | 5.9993 |
| 100% solids ambient cured, -acrylate with 1% silica, A9B6 | 0.846 |
| 100% solids ambient cured, -acrylate with 0% silica, A13B6 | 7.813 |
| 100% solids ambient cured, two coat system with A13B6 (0% silica) + A15B6 (2% silica) - polished side of concrete block | 7.4348 |
| 100% solids ambient cured, two coat system with A13B6 (0% silica) + A15B6 (2% silica) - unpolished side of concrete block | 2.1848 |
| 100% solids ambient cured, -acrylate with 1% silica + 3% PI: Esacure One, A16B6 | 1.4585 |

Those skilled in the art understand that the words used in the specification are words of description, and not words of limitation. Many variations and modifications may become apparent upon a reading of the specification without departing from the scope and spirit of the appended claims.

We claim:

1. A two part, self curing, low viscosity acrylic densifying and coating composition, comprising:
  a) a first component composition of (i) from about 25 parts per hundred weight (phw) to about 75 phw of at least one low viscosity cross linkable acrylate functional molecule with mono, di, or multifunctional acrylic vinyl ether or methacrylate functionality having a molecular weight of less than about 500; (ii) from about 16 phw to about 33 phw of a hydrophobic crosslinker; (iii) from about 1 phw to about 8 phw of at least one polymerizing catalyst or metal containing catalyst; and (iv) from about 1 phw of an adhesion coupling agent, and
  b) a second component composition of (i) an effective oxygenating acrylic cross linking agent; and (ii) from about 20 phw of a curing agent which contains polymerizable allylic, acrylic or methacrylic functional groups; wherein the composition has an initial viscosity sufficient to allow the composition to penetrate into the pores of a porous substrate and wherein said first component has a viscosity in the range of from about 50 cp to about 1000 cp.

2. The two part, self curing, acrylic densifying and coating composition of claim 1, wherein said first component further includes from about 0.5 phw to about 2 phw of methylethylketoxime as an anti skinning agent.

3. The two part, self curing, acrylic densifying and coating composition of claim 1, wherein said first component further includes from about 1 phw to about 3 phw of a rheology control agent.

4. The two part, self curing, acrylic densifying and coating composition of claim 3, wherein said first component rheology control agent is selected from a group consisting of methylethylketoxime, an amorphous colloidal silicon dioxide, and mixtures thereof.

5. The two part, self curing, acrylic densifying and coating composition of claim 4, wherein said first component rheology control agent is a mixture of 1 phw methylethylketoxime and 2 phw amorphous colloidal silicon dioxide.

6. The two part, self curing, acrylic densifying and coating composition of claim 1, wherein said first component acrylate functional molecules are selected from a group consisting of trimethylolpropane triacrylate; trimethylolpropane trimethacrylate, polyethylene glycol derivatives selected from the group consisting of methoxy polyethylene glycol monoacrylate, polyethylene glycol (200) diacrylate, polyethylene glycol (400) diacrylate, polyethylene glycol (600) diacrylate, ethoxylated trimethylolpropane triacrylates with different ethoxylation levels, hexanedioldiacrylate, urethane acrylates, epoxy acrylates, ethoxylated bisphenol A diacrylate, and mixtures thereof.

7. The two part, self curing, acrylic densifying and coating composition of claim 1, wherein said first component hydrophobic crosslinker is selected from a group consisting of ethoxylated (3) bisphenol A diacrylate or dimethacrylate, 1,6 hexanediol dimethacrylate, 1,6 hydroxymethyl diacrylate, isobornylmethacrylate, isobornyl acrylate and mixtures thereof.

8. The two part, self curing, acrylic densifying and coating composition of claim 1, wherein said metal containing catalyst comprises metal carboxylate condensation catalysts selected from the group consisting of zirconium 2-ethylhexanoate, cobalt 2-ethylhexanoate, carboxylic acid salts of manganese, iron, lead, calcium, cerium, zinc and mixtures thereof.

9. The two part, self curing, acrylic densifying and coating composition of claim 8, wherein said metal containing catalyst comprises a 50/50 mixture of a 6% solution of zirconium 2-ethylhexanoate, and a 6% solution cobalt 2-ethylhexanoate.

10. The two part, self curing, acrylic densifying and coating composition of claim 1, wherein said first component adhesion coupling agent is selected from the group consisting of methacrylate or acrylate functional alkoxysilane, bi-functional silanes containing a methacrylate or acrylate reactive organic group and a trimethoxysilyl inorganic group, epoxy functional silanes, epoxy functional silanes, amino functional silanes and mercapto functional silanes, and mixtures thereof.

11. The two part, self curing, acrylic densifying and coating composition of claim 1, wherein said adhesion coupling agent is methacrylate propyl trimethoxysilane.

12. The two part, self curing, acrylic densifying and coating composition of claim 1, wherein said second component oxygenating cross linking agent is present in an amount of up to about 5 phw.

13. The two part, self curing, acrylic densifying and coating composition of claim 1, wherein second component oxygenating cross linking agent is selected from the group consisting of t-butylperoxy-2-ethylhexanoate, t-amylperoxy-2-ethylhexanoate, cumene hydroperoxide, and mixtures thereof.

14. The two part, self curing, acrylic densifying and coating composition of claim 1, wherein said second component curing agent is a low viscosity polyallylglycidyl ether having a Brookfield viscosity @25° C. of about 200 cP.

15. The two part, self curing, acrylic densifying and coating composition of claim 1, wherein said second component further includes about 1 phw of methylethlyketone.

16. A composition, consisting essentially of:
a) a first component composition of (i) from about 25 parts per hundred weight (phw) to about 75 phw of at least one low viscosity cross linkable acrylate functional molecule with mono, di, or multifunctional acrylic vinyl ether or methacrylate functionality having a molecular weight of less than about 500; (ii) from about 16 phw to about 33 phw of a hydrophobic crosslinker; (iii) from about 1 phw to about 8 phw of at least one polymerizing catalyst or metal containing catalyst; and (iv) from about 1 phw of an adhesion coupling agent, and
b) a second component composition of (i) an effective oxygenating acrylic cross linking agent; and (ii) from about 20 phw of a curing agent which contains polymerizable allylic, acrylic or methacrylic functional groups;
wherein the composition has an initial viscosity sufficient to allow the composition to penetrate into the pores of a porous substrate and wherein said first component has a viscosity in the range of from about 50 cp to about 1000 cp.

* * * * *